United States Patent Office 3,275,633
Patented Sept. 27, 1966

3,275,633
4-HYDROXY-5-FLUOROPYRIMIDINE AND A PROCESS FOR PRODUCING IT AND OTHER COMPOUNDS
Zdeněk Buděšínský, Václav Jelínek, and Jaroslav Přikryl, all of Prague, Czechoslovakia, assignors to Spofa, Sdruzeni podniku pro zdravotnickou vyrobu, Prague, Czechoslovakia
No Drawing. Filed Jan. 17, 1963, Ser. No. 252,049
Claims priority, application Czechoslovakia, Jan. 23, 1962, 449/62
6 Claims. (Cl. 260—251)

The invention relates o 4-hydroxy-5-halogeno pyrimidines and to the preparation method thereof. The compounds have the general Formula I:

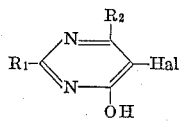

wherein $R_1$ and $R_2$ stand for hydrogen atoms, or for identical or different, straight or branched alkyls with 1–5 carbon atoms, and Hal for a halogen atom.

It was found that said compounds have a considerable cytostatic effect on certain kinds of neoplasias, as well in parenteral so as in peroral application. Especially significant are the substances having fluorine in position 5. So e.g. in experimental Gardner's lymphosarcoma in white mice the 4-hydroxy-5-fluoropyrimidine in a dose of 20 mg./kg. effects nearly complete suppression of tumor growth and a substantial prolongation of the survival time of treated animals compared with untreated controls.

According to the invention the compounds of the general Formula I are prepared in the way that compounds of the general Formula II

wherein Hal stands for the same as in Formula I, $R_2$ for hydrogen atom, straight or branched alkyl with 1–5 carbon atoms, or a carbalkoxy group, $R_3$ for methyl or ethyl, and $R_4$ for an atom of hydrogen, alkali metal, or for the same as $R_3$, which compounds, as the case may be, can be in their tautomeric form, are condensed with compounds or their salts respectively, of the general Formula III:

wherein Y signifies $R_1$ or a group $R_5S$, where $R_5$ is hydrogen, alkyl with 1–4 carbon atoms, or aralkyl, in aqueous medium or in medium of an alkanol with 1–3 carbon atoms, at elevated temperature, preferably at the boiling point of the reaction mixture, whereupon the condensation product, in the case with $R_2$ stands for a carbalkoxy group, is subjected to hydrolysis and decarboxylation, and in the case that Y stands for $R_5S$, is subjected to desulfuration, preferably by aid of Raney nickel or by aid of oxidation agents, especially hydrogen peroxide or nitric acid.

In performing the method according to the invention it is useful to start from alkylenolethers of α-halogen-α-acylacetic acids of general Formula II, or directly from non-isolated sodium salts of tautomeric enolates of α-halogen-α-acylacetic acid esters. In the subsequent preparation step the alkylenol ether or enolate is dissolved in a lower alkanol, preferably methanol, whereupon the compound of general Formula III is added, either in the form of salt, e.g. hydrochloride, or in the form of free base, and the reaction mixture is heated to boil for a certain time interval.

In the case that compounds of general Formula II are used, wherein Y stands for the $R_5S$, group, said group is readily splitted off by several hours boiling with Raney nickel.

By a simple treatment of the reaction mixture there are then obtained final products of the general Formula I in the form of crystalline substances, which can be purified by crystallization from water or organic solvents.

*Examples*

(1) To a suspension of 68 g. sodium ethanolate in 250 ml. benzene a mixture of 90 g. methyl formate and 106 g. ethyl fluoroacetate is dropwise introduced at a temperature of 0–10° C. under stirring. The mixture is then stirred for further 12 hours at room temperature, whereupon the temperature is raised to 40° C., and to the reaction mixture 170 g. dimethyl sulfate is slowly added, keeping the temperature below 50° C. After cooling down the reaction mixture is mixed up in 300 ml. water, the supernatant benzene layer separated and washed with water up to neutral reaction. Then it is dried with sodium sulfate and evaporated in vacuo. The residue representing crude ethyl α-methoxymethylene-α-fluoroacetae is either purified by distillation (B.P. of pure substance 84–86° C./16 mm. Hg; $n_D^{20}=1.4260$), or is used directly for condensation with formamidine. In this case 114 g. of crude methylenolather of ethylformylfluoroacetate obtained by the above described procedure is mixed with 100 ml. methanol, 81 g. formamidine hydrochloride added, and then into this mixture at a temperature 0—10° C. methanolic solution of sodium methylate, prepared by dissolving 22 g. sodium in 300 ml. methanol, is slowly added. Next day the mixture is shortly heated to boil, the eliminated sodium chloride sucked off and the filtrate evaporated in vacuo. The residue is dissolved in hot water and allowed to crystallize. The eliminated 4-hydroxy-5-fluoropyrimidine is sucked off, washed with a small volume of water, and is further purified by crystallization from water or from a benzene-ethanol mixture. M.P., 203–205° C.

(2) To a suspension of sodium ethylate prepared of 46 g. sodium and 235 ml. ethanol in 1000 ml. benzene at a temperature not exceeding 15° C. are dropwise added first 292 g. ethyl oxalate and then 212 g. ethyl fluoroacetate. After 12 hours the sodium enolate of ethyl ethoxalylfluoroacetate thus formed is sucked off, washed with benzene, dissolved in 500 ml. methanol, and is mixed with the solution of acetamidine base, prepared of 195 g. acetamidine hydrochloride and 46 g. sodium in 500 ml. methanol. The mixture is then boiled under reflux for 2 hours, whereupon it is acidified by methanolic hydrogen chloride up to distinct acid reaction with Congo red. The eliminated sodium chlorate is sucked off and the filtrate cooled down in the ice-box. The methyl ester of 2-methyl-4-hydroxy-5-fluoropyrimidine-6 - carboxylic acid thus eliminated shows on recrystallization from methanol M.P. 199–201° C.

The saponification of the ester to free acid is performed in the following manner: 10 g. of the ester is dissolved at room temperature in 20 ml. 5 N-NaOH. After 2 hours the reaction mixture is acidified with 5 N-HCl up to strongly acid reaction, the substance eliminated sucked off and recrystallized from dilute hydrochloric acid. Yield of the substance is 6.9 g. having M.P. 214–215° C. (starting from 182° C. decarboxylation sets in). Decarboxylation of the 2-methyl-4-hydroxy-5-fluoropyrimidine-6-carboxylic acid thus obtained to the final product is performed by heating to a temperature of 190–200° C. under pressure 10 mm. Hg. Of 5 g. acid 3.5 g. of 2-methyl-4-hydroxy-5-fluoropyrimidine with M.P. 215–217° C. is obtained.

(3) 19.0 g. ethyl isovaleroylfluoroacetate prepared by reacting Na-enolate of ethyl fluoroacetate with isovaleroyl chloride is introduced into a solution of 10 g. acetamidine hydrochloride in 50 ml. ethanol. Thereupon ethanolic solution of sodium ethylate (4.6 g. sodium in 80 ml. ethanol) is added, the mixture stirred for 5 hours, whereupon it is heated to boil and neutralized with ethanolic hydrogen chloride. The eliminated sodium chloride is sucked off and the filtrate concentrated. By recrystallization of the residue from 50% methanol pure 2-methyl-4-hydroxy-5-fluoro-6-isobutyl pyrimidine with M.P. 114–116° C. is obtained.

(4) To a mixture of sodium ethylate and sodium, prepared by reacting 46 g. sodium with 58 ml. ethanol in 600 ml. benzene, at a temperature of 10° C. and under stirring, is dropwise added first 180 g. ethyl formate and then 245 g. ethyl chloro-acetate. After 12 hours the formed Na-enolate of ethyl formylchloroacetate is sucked off, and after having been washed with benzene it is dissolved in 250 ml. methanol. This solution is then mixed with methanolic solution of the acetamidine base, prepared of 187 g. acetamidine hydrochloride and 46 g. sodium in 500 ml. methanol. The reaction mixture is allowed to stand at room temperature for 12 hours, whereupon it is heated to boil under reflux for 2 hours. It is then acidified with methanolic hydrogen chloride up to distinct acid reaction with Congo red, the eliminated sodium chloride is sucked off while hot, and the filtrate concentrated to half the volume. After cooling down the eliminated product is sucked off. Yield is 138 g. of 2-methyl-4-hydroxy-5-chloro pyrimidine with M.P. 227–228° C., after recrystallization of the crude product from water.

(5) Into the suspension of sodium ethylate, prepared of 5.5 g. sodium and 5.5 g. ethanol in 25 ml. benzene, there is dropwise added, under external cooling with ice water and stirring, the mixture of 32.2 g. ethyl oxalate and 21.2 g. ethyl fluoroacetate. Stirring is continued for further 10 hours, whereupon to the thus formed Na-enolate of ethyl ethoxalyl-fluoroacetate the ethanolic solution of formamidine base, prepared of 16.1 g. formamidine hydrochloride and of an equivalent quantity of sodium ethylate (4.6 g. sodium in 100 ml. ethanol), is added. The mixture is then slowly heated to boil and boiled under reflux for 2 hours. The mixture while hot is acidified with ethanolic hydrogen chloride. The product eliminated is sucked off after cooling, mixed up in 200 ml. water, sucked off anew and washed with water for removing sodium chloride. The remaining crude ethyl ester of 4-hydroxy-5-fluoropyrimidine-6-carboxylic acid has on recrystallization from 90%-ethanol M.P. 235° C. This ester is then dissolved in 10%-sodium hydroxide and saponified by standing at room temperature for 10 hours. By strong acidification with concentrated hydrochloric acid there is eliminated the 4-hydroxy-5-fluoropyrimidine-6-carboxylic acid, which on recrystallization from 5%-hydrochloric acid has M.P. 221° C. (decomp.). Yield is 11.0 g. The acid is then decarboxylated by heating in α-methylnaphthalene to a temperature of 210–220° C. The product eliminated on cooling down is sucked off, washed with benzene and ethanol. Yield is 7.1 g. The obtained 4-hydroxy-5-fluoropyrimidine is purified either by crystallization from water, or by sublimation in the water-pump vacuo. M.P. 209–210° C.

(6) Into 50 ml. of 2-molar methanolic solution of sodium methylate cooled to −5° C. there are introduced 5 g. formamidine hydrochloride and 9.5 g. ethyl n-valeroyl-fluoroacetate, prepared by reacting n-valeroyl chloride with Na-enolate of ethyl fluoroacetate. The reaction mixture is stirred for 1 hour and then allowed to stand. Next day it is neutralized with methanolic hydrogen chloride, the eliminated sodium chloride sucked off, and the filtrate concentrated. The oily residue crystallizes by cooling down. The crude product sucked off is purified by crystallization from aqueous methanol (1:1). The purified 4-hydroxy-5-fluoro-6-n-butyl pyrimidine has M.P. 87–88° C.

(7) 10.2 g. of 2-mercapto-4-hydroxy-5-fluoropyrimidine (M.P. 225–226° C.) obtained by condensation of ethyl formylfluoroacetate with thiourea, is dissolved in 100 ml. of 2.5%-ammonia whereupon at the temperature of 70–90° C. 40 g. of moist Raney nickel are added; this is boiled under reflux for 2 hours, whereupon the Raney nickel is sucked off, washed with water, and the filtrate concentrated in vacuo to a small volume. By acidification 4.5 g. of 4-hydroxy-5-fluoropyrimidine is eliminated, which on recrystallization has M.P. 204–205° C.

(8) 17.6 g. of 2-methylmercapto-4-hydroxy-5-chloro pyrimidine and 150 g. of moist Raney nickel are boiled in 800 ml. of 2%-ammonia under reflux for 4 hours. Thereupon the nickel is filtered off and several times extracted by boiling with 800 ml. of 0.2% ammonia. The united filtrates are evaporated to dryness and the residue recrystallized first from a benzene-ethanol mixture and thereupon from water. Yield is 6.0 g. of 4-hydroxy-5-chloro pyrimidine with M.P. 180–182° C.

(9) Of 2-ethylmercapto-4-hydroxy-5-iodo pyrimidine there has been obtained in analogous way the 4-hydroxy-5-iodo pyrimidine, having M.P. 254–265° C.

(10) To sodium methanolate, prepared of 0.3 g. sodium and 15 ml. methanol there are added 1.9 g. of thiourea and 3.0 g. of methyl alphafluoroacetate, and the mixture boiled under reflux for 5 hours. It is then evaporated in vacuo, the residue dissolved in 20 ml. water, filtered, and from the filtrate there are eliminated by acidification with dilute hydrochloric acid 1.1 g. of 2-mercapto-4-hydroxy-5-fluoro-6-methyl pyrimidine. By recrystallization from water the substance shows M.P. 294–297° C. (decomp.). 1.0 g. of the 2-mercapto-4-hydroxy-5-fluoro-6-methyl pyrimidine is dissolved in 15 ml. water under addition of 2 ml. of 20% ammonia. Thereupon 3 g. of moist Raney nickel are added, and the mixture boiled under reflux for 3 hours, whereupon the nickel is sucked off and several times extracted by boiling with distilled water. The united filtrates are evaporated in vacuo to dryness, and the residue extracted with chloroform. The chloroform extract is evaporated, and the residue is recrystallized from butanol. The 4-hydroxy-5-fluoro-6-methyl pyrimidine has M.P. 143–144° C. Yield is 0.45 g. The hydrochloride of the compound melts at 177–178° C.

(11) To sodium ethylate, prepared by dissolving 0.88 g. sodium in ml. ethanol, 4.8 g. of ethyl alpha-fluoro-alpha-valeroyl acetate and 2.9 g. of thiourea are added. The mixture is stirred at room temperature for 2 hours and then at 50–60° C. for further 3 hours, whereupon the reaction mixture is evaporated in vacuo to dryness. The residue is dissolved in 200 ml. water, filtered and the filtrate acidified with dilute hydrochoric acid. There is obtained 2.5 g. of 2-mercapto-4-hydroxy-5-fluoro-6-n-butyl pyrimidine, which on recrystallization from 40%-ethanol has M.P. 258–259° C. This substance was desulfurated in the same way as described in Example 8 to yield 4-hydroxy-5-fluoro-6-n-butyl pyrimidine, which in crude state shows M.P. 75–77° C. and is preferably purified by conversion to hydrochloride (by hydrogen chloride in acetone). After recrystallization from ethyl acetate it has M.P. 106–107° C.

We claim:
1. The compound 4-hydroxy-5-fluoropyrimidine with melting point 209–210° C.

2. The method which comprises condensing a compound of the formula:

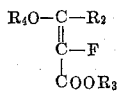

wherein $R_2$ is selected from the group consisting of hydrogen and carbalkoxy, wherein $R_3$ is selected from the group consisting of methyl and ethyl, and $R_4$ is selected from the group consisting of hydrogen, alkali metal, methyl and ethyl, with a compound selected from the group consisting of compounds of the formula:

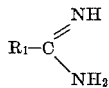

wherein $R_1$ is selected from the group consisting of hydrogen and alkyl of 1–5 carbon atoms, and salts of said compounds, thereby forming the corresponding condensation product of the formula:

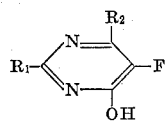

wherein $R_1$ and $R_2$ have the same definitions as above.

3. The method which comprises condensing a compound of the formula:

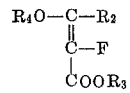

wherein $R_2$ is selected from the group consisting of hydrogen and carbalkoxy, wherein $R_3$ is selected from the group consisting of methyl and ethyl, and wherein $R_4$ is selected from the group consisting of hydrogen, alkali metal, methyl and ethyl, with a compound selected from the group consisting of compounds of the formula:

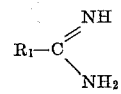

wherein $R_1$ is selected from the group consisting of hydrogen and alkyl of 1–5 carbon atoms, and salts of said compounds, thereby forming the corresponding condensation product of the formula:

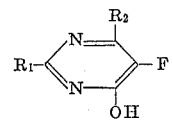

wherein $R_1$ and $R_2$ have the same definitions as above; and when $R_2$ is carbalkoxy subjecting said condensation product to hydrolysis and decarboxylation, thereby obtaining a compound of the last structural formula above wherein $R_2$ is hydrogen.

4. The method which comprises condensing a compound of the formula:

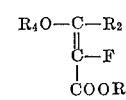

wherein $R_2$ is selected from the group consisting of hydrogen and carbalkoxy, wherein $R_3$ is selected from the group consisting of methyl and ethyl, and $R_4$ is selected from the group consisting of hydrogen, alkali metal, methyl and ethyl, with a compound selected from the group consisting of compounds of the formula:

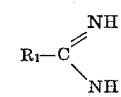

wherein $R_1$ is selected from the group consisting of hydrogen and alkyl of 1–5 carbon atoms, and salts of said compounds in aqueous medium, thereby forming the corresponding condensation product of the formula:

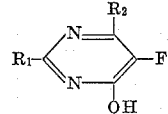

wherein $R_1$ and $R_2$ have the same definitions as above; and when $R_2$ is carbalkoxy subjecting said condensation product to hydrolysis and decarboxylation, thereby obtaining a compound of the last structural formula above wherein $R_2$ is hydrogen.

5. The method which comprises condensing a compound of the formula:

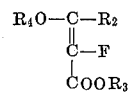

wherein $R_2$ is selected from the group consisting of hydrogen and carbalkoxy, wherein $R_3$ is selected from the group consisting of methyl and ethyl, and wherein $R_4$ is selected from the group consisting of hydrogen, alkali metal, methyl and ethyl, with a compound selected from the group consisting of compounds of the formula:

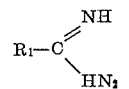

wherein $R_1$ is selected from the group consisting of hydrogen and alkyl of 1–5 carbon atoms, and salts of said compounds in a medium of an alkanol of 1–3 carbon atoms, thereby forming the corresponding condensation product of the formula:

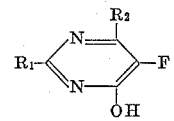

wherein $R_1$ and $R_2$ have the same definitions as above; and when $R_2$ is carbalkoxy subjecting said condensation product to hydrolysis and decarboxylation, thereby obtaining a compound of the last srtuctural formula above wherein $R_2$ is hydrogen.

6. The method which comprises condensing a compound of the formula:

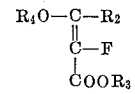

wherein $R_2$ is selected from the group consisting of hydrogen and carbalkoxy, wherein $R_3$ is selected from the group consisting of methyl and ethyl, and wherein $R_4$ is selected from the group consisting of hydrogen, alkali metal, methyl and ethyl, with a compound selected from the group consisting of compounds of the formula:

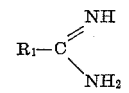

wherin $R_1$ is selected from the group consisting of hydrogen and alkyl of 1–5 carbon atoms, and salts of said compounds in a medium selected from the group consisting of water and alkanols of 1–3 carbon atoms at an elevated temperature up to the boiling point of the reaction mixture, thereby forming the corresponding condensation product of the formula:

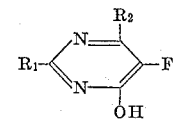

wherein $R_1$ and $R_2$ have the same definitions as above; and when $R_2$ is carbalkoxy subjecting said condensation product to hydrolysis and decarboxylation, thereby obtaining a compound of the last structural formula above wherein $R_2$ is hydrogen.

References Cited by the Examiner
UNITED STATES PATENTS

| | | | |
|---|---|---|---|
| 2,417,318 | 3/1947 | Northey | 260—251 |
| 2,802,005 | 8/1957 | Heidelberger et al. | 260—251 |
| 3,051,626 | 8/1962 | Rao | 167—78 |

OTHER REFERENCES

Bergmann et al., J. Chem. Soc., London (1959), pages 3278–85.

Chesterfield et al., J. Chem. Soc., London (1955), pages 3478–81.

Isbecque et al., Helv. Chim. Acta., vol. 42 (1959), pages 1317–23.

NICHOLAS S. RIZZO, *Primary Examiner.*

HENRY R. JILES, *Assistant Examiner.*